Jan. 1, 1935. J. P. SPANG 1,986,074
MACHINE FOR SLITTING MEAT
Filed March 7, 1932 6 Sheets-Sheet 1

Inventor.
Joseph P. Spang
by Heard Smith & Tennant.
Attys.

Jan. 1, 1935.  J. P. SPANG  1,986,074
MACHINE FOR SLITTING MEAT
Filed March 7, 1932   6 Sheets-Sheet 2

Inventor.
Joseph P. Spang
by Heard Smith & Tennant.
Attys.

Jan. 1, 1935. J. P. SPANG 1,986,074
MACHINE FOR SLITTING MEAT
Filed March 7, 1932 6 Sheets-Sheet 3

Inventor.
Joseph P. Spang
by Heard Smith & Tennant.
Attys.

Jan. 1, 1935.  J. P. SPANG  1,986,074
MACHINE FOR SLITTING MEAT
Filed March 7, 1932  6 Sheets-Sheet 5

Inventor.
Joseph P. Spang
by Heard Smith & Tennant.
Attys

Jan. 1, 1935. J. P. SPANG 1,986,074
MACHINE FOR SLITTING MEAT
Filed March 7, 1932 6 Sheets-Sheet 6
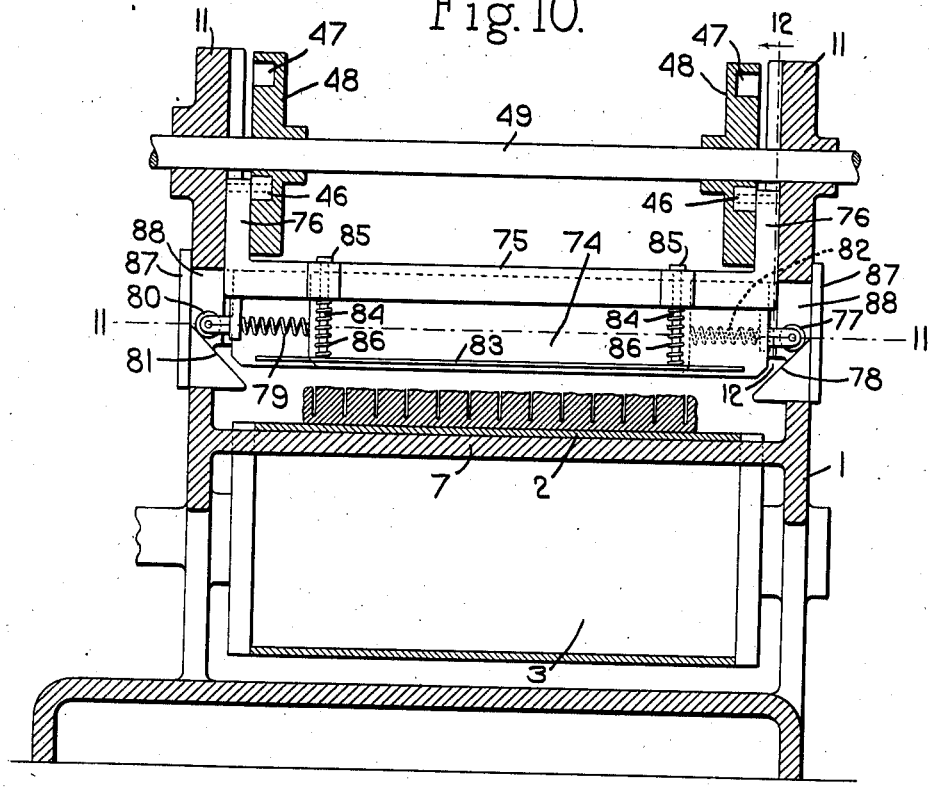
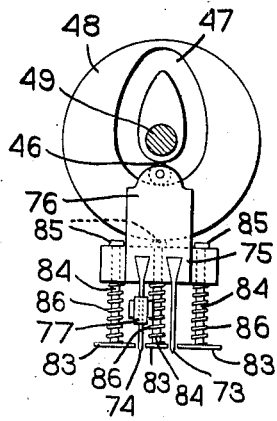
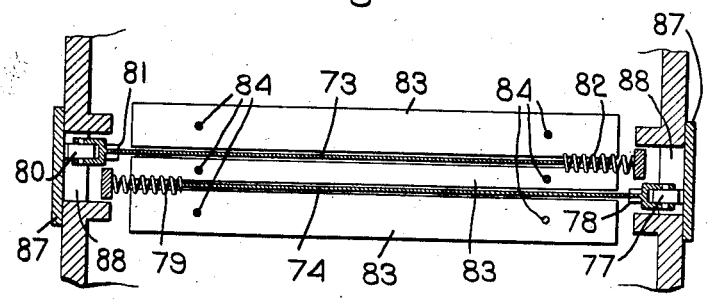
Inventor.
Joseph P. Spang
by Heard Smith & Tennant.
Attys.

Patented Jan. 1, 1935

1,986,074

UNITED STATES PATENT OFFICE 1,986,074

MACHINE FOR SLITTING MEAT

Joseph P. Spang, Quincy, Mass.

Application March 7, 1932, Serial No. 597,115

13 Claims. (Cl. 17—25)

This invention relates to a machine for slitting meat by forming in the meat two groups of slits which extend part way only through the slice of meat and with the slits of one group crossing those of the other group.

One of the objects of the invention is to provide a machine for thus slitting meat in which the two groups of crossing slits are formed in the meat as it is moved forward in the same direction, or, in other words, during a single pass of the meat through the machine.

This is accomplished by providing two cutting elements, one of which is in the form of a series or gang of slitting knives adapted to cut slits in the meat extending in a direction in which the meat is fed through the machine and the other of which is constructed to cut slits in the meat in a direction transverse to the direction of feed of the meat.

An advantage of this invention is that the two series of crossing slits can be cut in the meat with a single pass of the meat through the machine and without the necessity of turning the meat in the machine or making a second pass of the meat through the machine to cut the second series of slits.

In order to give an understanding of the invention I have illustrated in the drawings some selected embodiments thereof which will now be described after which the novel features will be pointed out in the appended claims.

In the drawings, Fig. 1 is a longitudinal sectional view through a meat-slitting machine embodying my invention;

Fig. 10 is a section similar to Fig. 8 but showing still a different embodiment of the invention;

Fig. 11 is a section on the line 11—11, Fig. 10;

Fig. 12 is a section on the line 12—12, Fig. 10;

Figure 1:
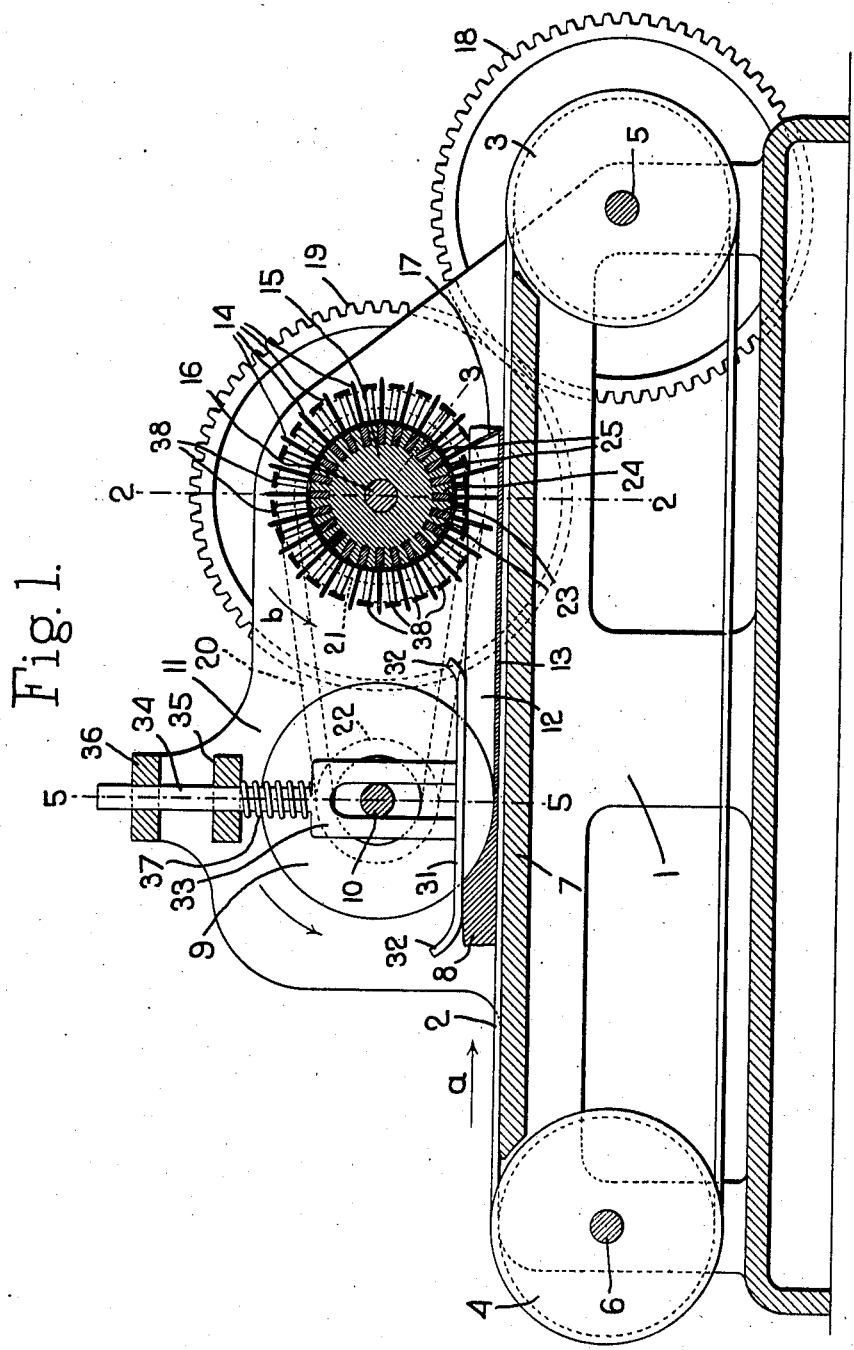

The operative parts of the machine are mounted on a suitable frame 1 and these include means for feeding the meat forward and two meat-slitting elements, one of which is designed to cut slits in the meat in a direction parallel to the line of feed and the other of which cuts slits in the meat in a direction transverse to the line of feed.

Any appropriate means for feeding the meat forward may be employed. As herein shown there is provided an endless belt or feed apron 2 for this purpose. This belt is shown as passing around two pulleys 3 and 4 which are carried by shafts 5 and 6 that are mounted in the frame. One of these shafts is driven thereby feeding the feed apron 2 forward in the direction of the arrow a, Fig. 1.

The frame 1 is provided with a platform or support 7 on which the upper run of the belt rests.

The meat which is being slit is indicated at 8 and it is placed on the left hand end of the feed apron 2 and in the construction shown in Fig. 1 it is fed through the machine from left to right.

The slitting element which cuts slits in the meat extending parallel to the line of feed comprises a plurality of slitting knives properly supported by the frame and beneath which the meat passes as it is fed forward. These slitting knives may be of any suitable shape but I will preferably employ rotary slitting knives as indicated at 9, there being a plurality or gang of such knives which are fast on a shaft 10 which is journalled in the side pieces 11 of the frame 1. These rotary slitting knives 9 will preferably be arranged that they will cut slits 12 in the meat which extend nearly through the meat from the top to the bottom but do not cut entirely through the meat thereby leaving a thin web or film 13 of unslit meat on the under face of the slice.

The slitting element which cuts the slits in the meat transversely to the line of feed comprises one or more slitting knives extending transversely to said line and operating to make the transverse slits as the meat is fed forward. In the construction shown in Fig. 1 there are a plurality of such knives which are mounted on a cylindrical knife carrier and which are so arranged that as the knife carrier rotates and the meat is fed forward the successive knives or blades operate to cut the transverse slits in the meat.

The transverse knives in Fig. 1 are indicated at 14 and these are in the form of radial blades which are carried by a roll or drum 15 mounted on a shaft 16 that is journalled in the side pieces 11 of the frame. The roller drum 15 is driven in the direction of the arrow b Fig. 1 so that the knives will have the same surface speed as the feed apron 2. As the piece of meat 8 is fed forward the gang of knives 9 cut the slits 12 therein which extend in the direction of feed, and the knives 14 will cut slits 17 which extend transversely to the direction of feed. Any suitable means for driving the feed apron and the two slitting elements may be employed. As herein shown the shaft 5 may be a driving shaft to which power is applied and this shaft is shown as having a gear 18 thereon which meshes with a gear 19 on the shaft 16. The shaft 16 carrying the cutting blades 14 is connected to the shaft 10 carrying the cutters 9 through the medium of a sprocket chain drive, the latter consisting of a sprocket chain 20 which passes around sprocket wheels 21 and 22 on the shafts 16 and 10 respectively.

The gear connecting the feed apron 2 and the shafts 16 and 10 will preferably be so constructed that the knives 14 move forward at the same surface speed as the meat while the knives 9 will rotate faster thereby producing a draw or shearing cut.

I will also preferably provide means for giving the knives 14 a transverse movement during their operation on the meat so that these knives 14 also operate on the meat with a shearing or draw cut. For this purpose each of the knives 14 is mounted in the roll 15 so as to permit the knife to move relative to the roll in the direction of the length of the knife or in the direction of the slit which the knife makes in the meat 8. For this purpose each knife 14 is formed at its inner edge with a head 23 which is slidably mounted in a corresponding groove 24 formed in the roll 15. The heads 23 of the knives are thicker than the blade portion and the heads are retained in position by means of retaining strips 25 which are situated between the blades and are secured to the roll 15. The edges of these retaining strips 25 overlap the shoulders formed at the point where the blades of the knives join the thickened heads.

Figure 2:
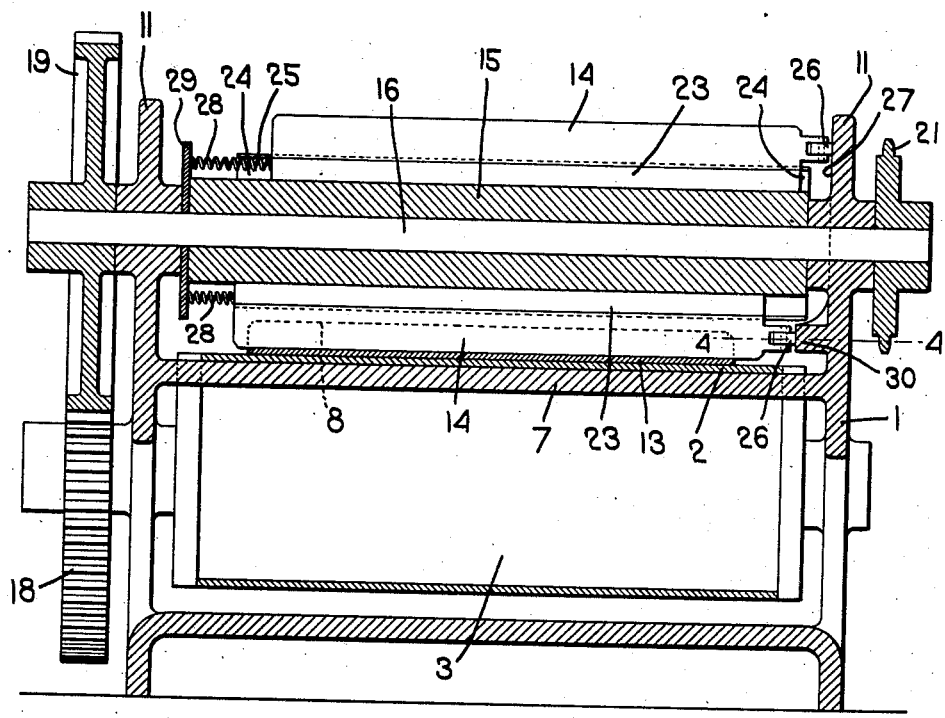
Fig. 2 is a section on the line 2—2, Fig. 1.
Figure 3:
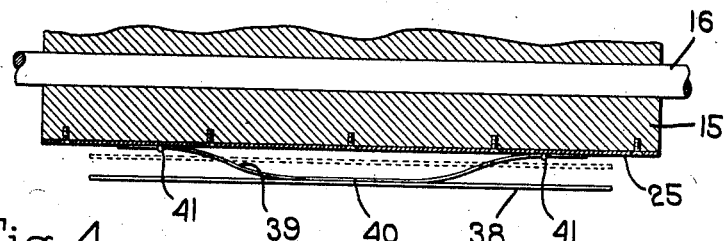
Fig. 3 is a fragmentary section on the line 3, Fig. 1 showing the stripper.
Figure 4:
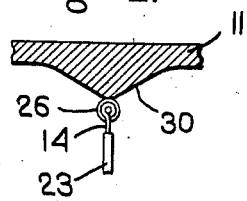
Fig. 4 is a section on the line 4—4, Fig. 2.
Figure 5:
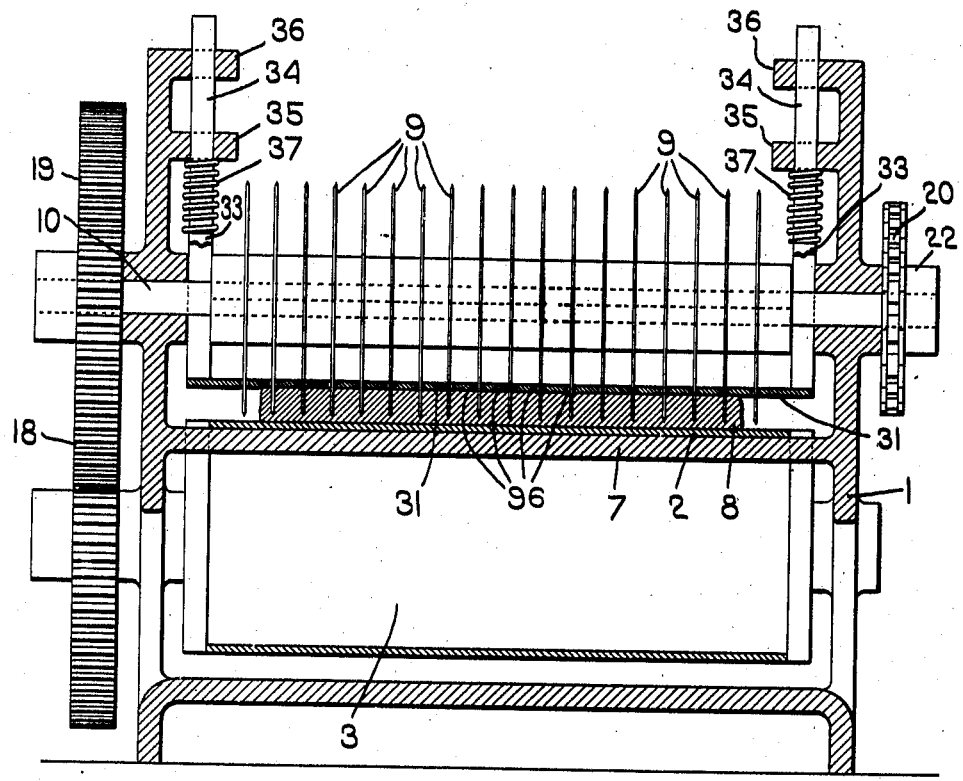
Fig. 5 is a section on the line 5—5, Fig. 1.
Figure 6:
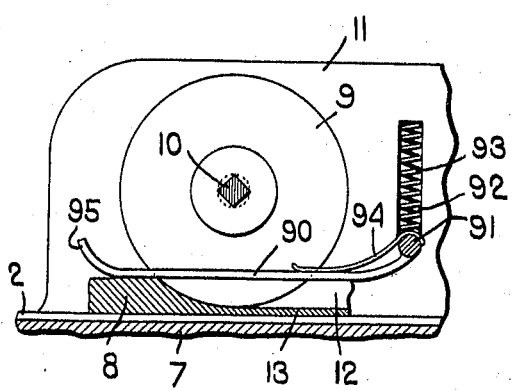
Fig. 6 is a fragmentary view showing a different form of stripper from that shown in Fig. 3.

Each blade 14 is given its transverse movement relative to the drum or roll 15 through the co-operation of a cam and spring. Each blade has at one end a roll 26 which engages the inner face 27 of one of the sides 11 of the frame. Each blade is acted on by a spring 28 which urges the blade toward the right Fig. 2 and maintains the roll 26 in contact with the face 27. The springs 28 are shown as backed up on the disk 29 which is fast on the shaft 16.

The side frame 11 against which the rolls 26 bear is formed with a cam portion 30 with which each roll 26 engages as the corresponding knife is entering the meat 8. The movement of the roll 26 over the cam 30 will cause the knife to have a movement in the direction of its length and this occurs while the knife is entering the meat 8 so that as each transverse slit 17 is being cut the knife cutting the slit is acting on the meat with a draw cut thus making a clean cut slit.

The device also includes suitable means for stripping the meat from the knives so as to prevent it from clinging to the knives as the slits are being cut. The stripper illustrated for stripping the meat from the gang of knives 9 is in the form of a stripping plate 31 which is provided with slots 96 through which the knives 9 extend. This stripping plate is yieldingly held against the meat and it extends beyond the edges of the knives so that it holds the meat 8 on the apron and prevents the meat from clinging to the knives 9. Said stripping plate is shown as having its front and rear edges curved upwardly slightly as indicated at 32 and it is shown as having at each end a yoke portion 33 which embraces the shaft 10. Each yoke portion is also shown as provided with a stem 34 which extends upwardly through two guiding ears 35, 36 which are formed on the side 11 of the frame. A spring 37 encircles each stem and is situated between the ear 35 and the yoke 33, such spring urging the stripper plate downwardly.

For stripping the meat from the knives 14, I propose to employ stripper elements which are located between the knives and which extend longitudinally of the knives. Such stripper elements are indicated at 38 and each is in the form of a plate or strip which is mounted on a spring support 39 that is secured to the roll 15. This spring 39 is in the form of a leaf spring and the central portion thereof is secured to the stripper plate 38 as indicated at 40 and the ends of each leaf spring 39 extend through retaining loops 41 that are secured to the hold-down plate 25. These stripper plates 38 will thus yield upwardly as they come in contact with the meat as indicated in Fig. 1 and as the knives 14 are withdrawn from the meat the stripper plates serve to force the meat off from the knives and retain it on the feed apron 2.

Figure 7:
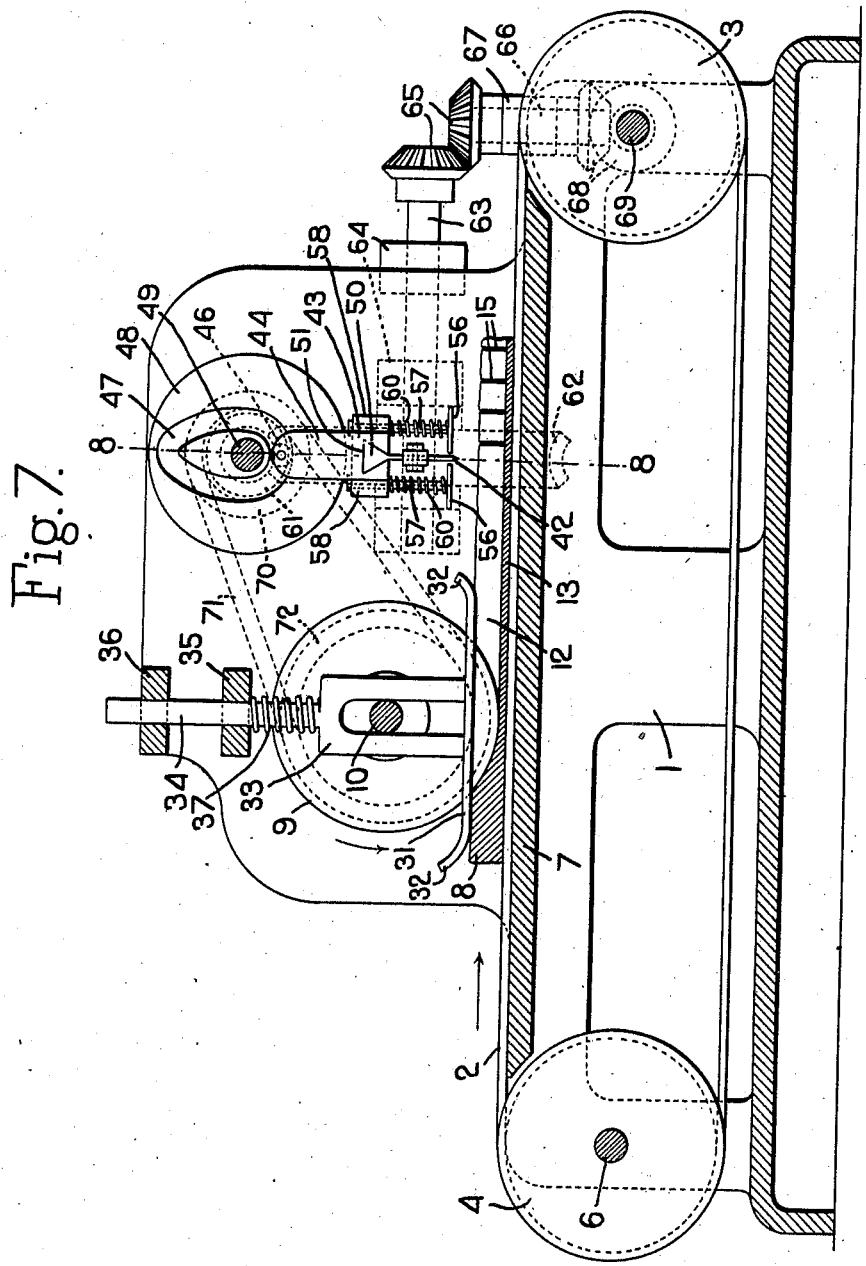
Fig. 7 is a view similar to Fig. 1 but showing a different embodiment of the invention.

In Fig. 7, I have shown a different embodiment of the invention wherein a single knife is employed to make the transverse slits instead of the plurality of knives mounted on a rotary drum as shown in Fig. 1. In Fig. 7 the feed apron 2 and gang of knives 9 for cutting the slits 12 are the same as illustrated in Fig. 1. In this embodiment, however, the transverse slits 17 in the meat are cut by a single knife 42 which has a vertical motion and which also is provided with a longitudinal motion. This knife 42 is mounted in a vertically-reciprocating head 43 which is provided at its ends with upstanding arms 44 that are guided in ways 45 formed in the inner faces of the sides 11 of the frame 1. Each upstanding arm 44 is provided with a roll 46 which is received in a cam groove 47 formed in a cam element 48 that is fast on the shaft 49, the latter being journalled in the sides 11 of the frame. With this arrangement the knife 42 will be given a vertical chopping motion and at each downward stroke it will cut a transverse slit 15 in the meat 8.

Figure 9:
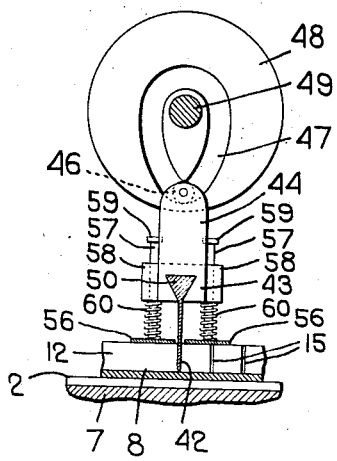
Fig. 9 is a section on the line 9—9, Fig. 8.

Means are provided for causing the knife to give a draw or shearing cut on the meat and for this purpose the knife is mounted to slide in the head 43. As shown in Figs. 7 and 9 the knife is formed with a thickened back 50 which fits in a groove 51 extending longitudinally of the head 43.

Figure 8:
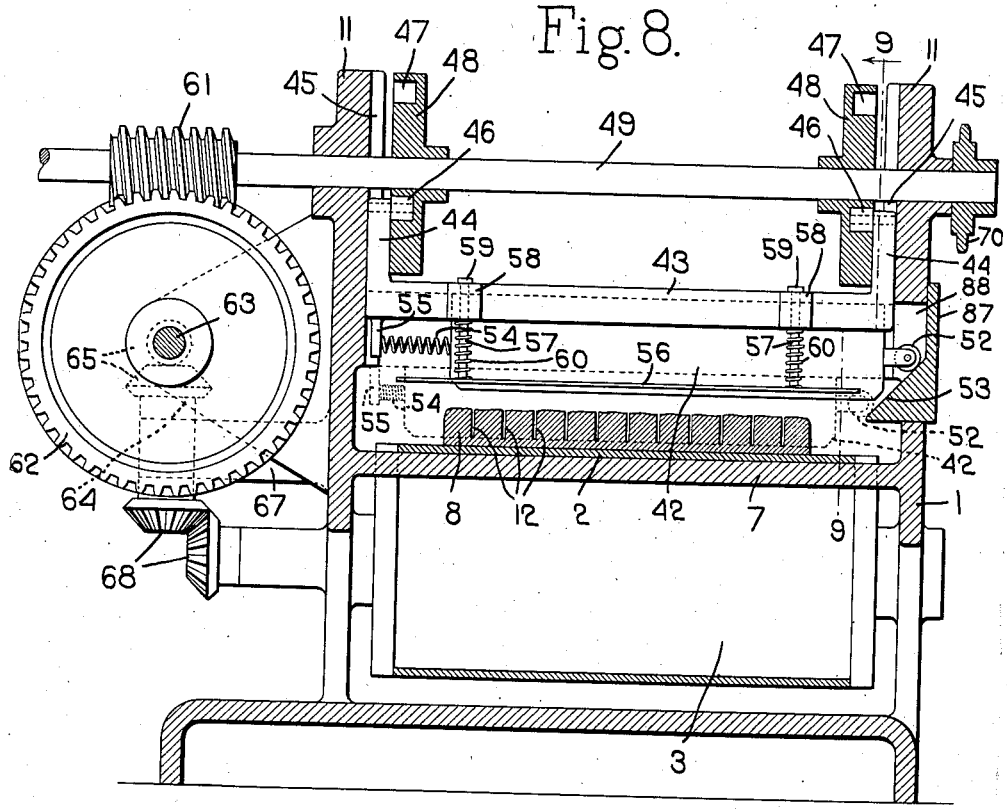
Fig. 8 is a section on the line 8—8, Fig. 7.

The knife is provided at its end with a roll 52 adapted to engage a stationary cam surface 53 as the knife makes its cutting stroke, the engagement of the roll with this cam surface serving to move the knife in the direction of its length as shown by the dotted lines Fig. 8. The knife is acted on by a spring 54 which is confined between the end of the knife and a projection 55 depending from the head 43. This spring 54 keeps the roll in engagement with the cam surface 53.

The knife is shown in raised position in Figs. 7 and 8 and from the above it will be seen that as it makes its downward or cutting stroke the roll 52 will engage the cam surface 53, thereby moving the knife in the direction of its length as it moves downwardly, as seen by dotted lines Fig. 8. The slitting of the meat, therefore, is done with a draw cut which will produce a cleancut slit. As the knife rises from its lowered to its raised position the spring 54 will cause the knife to again have a movement in the direction of its length. In this embodiment of the invention the means for stripping the meat from the knife is in the form of two stripper plates 56 which are yieldingly held against the meat during the cutting stroke of the knife 42 and which retain such yielding pressure as the knife is rising from the meat after having made the transverse slit 15.

Each stripping plate is shown as having a stem 57 rising from each end thereof, each stem extending through a guiding boss 58 on the side of the head 43 and each stem being provided at its upper end with a head 59 which by its engagement with the head 43 limits the downward movement of the stripper plate. Each stripper plate is yieldingly held on the meat during the stripping operation by means of springs 60 which encircle the stems 57 and are confined between the stripper plate 56 and the ears 58.

As the head 43 descends to give the knife 42 its cutting movement the stripper plates 56, which are normally held in a position about flush with the cutting edges of the knife, are brought into engagement with the meat and as the knife cuts into the meat the springs 60 will yield and will cause the stripping plates to apply a yielding pressure to the meat. This yielding pressure is maintained until the knife is withdrawn from the meat, said strippers thus acting to strip the meat from the knife.

Any appropriate means for operating the shaft 49 in timed relation with the apron 2 may be employed without departing from the invention. As herein shown the shaft 49, which may be the power shaft to which the power is applied, is provided with a worm 61 which meshes with and drives a worm gear 62 which is fast on a shaft 63, journalled in suitable bearings 64 carried by the frame. This shaft 63 is connected by bevelled gears 65 with a vertical shaft 66 also carried by suitable bearings 67 mounted on the frame, and the shaft 66 is connected by bevelled gears 68 with the shaft 69 carrying the roller 3 over which the feed apron 2 passes.

The gearing between the shaft 49 and the shaft 69 will be so timed that the feed apron will be advanced the desired distance between each of the cutting movements of the knife 42.

The shaft 10 carrying the rotary knives 9 is shown as being driven from the shaft 49 and for this purpose said shafts 49 and 10 are connected by a sprocket chain 71 which passes around sprocket wheels 70 and 72 on said shafts 49 and 10 respectively. This driving connection is designed so that the knives 9 will operate with a draw or shear cut.

The device shown in Fig. 7 has a vertically-moving single transversely-extending knife. In Figs. 10, 11 and 12, I show a construction wherein there are a plurality of such knives, two being shown. These knives are indicated at 73 and 74 and are both carried by a head or cross member 75 similar to the head 43. This head 75 is given a vertical reciprocation by the cams 48 mounted on a shaft 49 extending transversely of the frame, each cam having a cam groove 47 therein in which is received a follower 46 carried by an arm 76 rising from the end of the head 75. The knives 73 and 74 are mounted to reciprocate in the head 75 in the direction of their length as described with reference to the knife 42.

The knife 74 is provided at one end with a roll 77 adapted to co-operate with a cam 78 which causes the knife to move in the direction of its length as the head descends, said roll being held against the cam by the spring 79. The knife 73 is also provided at one end with a roll 80 which operates against a cam 81 and said roll is held against the cam by a spring 82. The two cams 81 and 78 are on opposite sides of the frame so that when the head 75 has its downward movement the knives 73, 74 will be moved in the direction of their length in opposite directions.

In this embodiment a plurality of transverse cuts will be made simultaneously each time that the head 75 makes its downward movement.

The knives 73 and 74 have stripper plates 83 associated therewith which are carried by the head in the same manner as the stripper plates 56. Each plate has a pair of supporting pins 84 rising therefrom which extend through bearings in the head 75 and are provided at their upper end with heads 85. Each pin is surrounded by a spring 86 which yieldingly holds the stripper plates in their lowered position but which become compressed during the cutting movement of the knives so that as the knives are raised the expansive movement of the springs strip the meat from the knives.

The cam surfaces 78, 81 and 53 may be formed directly on the sides 11 of the frame or may be on separate cam elements attached to the frame. The latter is the construction herein shown, the cam 53 being formed on a cam plate 87 which is detachably secured to the side 11 of the frame, the latter being provided with an opening 88 through which the cam extends. A similar construction is provided with reference to the cams 78 and 81.

It will be understood that the knives 42 and 73 and 74 will be so arranged as to cut slits 15 nearly but not entirely through the meat as best seen in Figs. 7 and 9 so that when the slice of meat has been delivered from the machine it has the two groups of crossing slits cut therein, the slits of each group being cut nearly but not entirely through the meat.

With this invention the desired groups of slits are cut in the meat 8 during a single pass of the meat through the machine and the machine will, therefore, operate more rapidly than meat-slitting machines of that type that require two passes of the meat to cut the two groups of slits.

I claim.

1. In a meat-slitting machine, the combination with a feed apron for feeding meat forward, of a gang of rotary slitting knives for cutting in the meat, as it is fed forward, slits extending in the direction of the length of feed, a reciprocating slitting knife for cutting slits in said meat transversely to the direction of feed, a stationary stripper co-operating with the rotary knives to strip the meat therefrom and a yieldingly-mounted vertically-movable stripper co-operating with the reciprocating slitting knife to strip meat therefrom.

2. In a meat-slitting machine, the combination with a feed apron for feeding meat forward, of a gang of rotary slitting knives for cutting in the meat, as it is fed forward, slits extending in the direction of the length of feed, a vertically-movable knife-carrying head, a slitting knife carried thereby for cutting slits in said meat transversely to said line of feed and means to give said vertically-movable knife a movement relative to the head in a direction transversely of the feeding movement and during its downward movement.

3. In a machine for slitting meat, the combination with means for feeding meat forward, of a vertically-moving head, a slitting knife carried thereby and extending transversely to the line of feed, and stripper plates yieldingly carried by said head for automatically stripping the meat from the knives during the retracting movement of the latter.

4. In a meat-slitting machine, the combination with means for feeding meat forward, of a gang of knives for cutting slits in the meat in the direction of the length of feed, a slitting knife extending transversely to the line of feed, means for reciprocating said knife in a vertical direction, thereby to cut a second series of slits in the meat extending transversely to said line of feed and means rendered operative by the downward movement of said knife to give it a movement in a direction transversely of the direction of feed.

5. In a meat-slitting machine, the combination with means for feeding meat forward, of a gang of knives for cutting slits in the meat in the direction of the feeding movement, a slitting knife extending transversely to the direction of feed, means for reciprocating said knife in a vertical direction thereby to cut a second series of slits in the meat extending transversely to said line of feed, and means to give said knife a horizontal movement in a direction transversely to the direction of feeding movement during the movement of said knife toward the meat.

6. In a meat-slitting machine, the combination with means for feeding meat forward, of a gang of rotary slitting knives for cutting slits of said meat as it is fed forward, a shaft on which said gang of knives is mounted, a stripper plate having slots through which the knives extend, said stripper plate having at each end a slotted yoke through which the shaft extends, and springs acting on said yokes for yieldingly holding the plate against the meat.

7. In a meat-slitting machine, the combination with means for feeding meat forward, of a plurality of knives to cut in the meat, as it is fed forward, a series of slits extending in the direction of feed, a slitting knife mounted separately from said plurality of knives and having a cutting edge extending transversely to the line of feed, means for moving said slitting knife bodily toward and from the meat as the latter is fed to cut slits in the meat extending transversely to the line of feed, and means operative during the movement of said slitting knife toward the meat to give said knife a horizontal movement in a direction transversely to the direction of feeding movement.

8. In a meat-slitting machine, the combination with means for feeding meat forward, of means to cut in the meat, as it is fed forward, a series of slits extending in the direction of feed, a knife-carrying member, a slitting knife carried thereby and having a cutting edge extending transversely of the line of feed, means to operate the knife-carrying member to cause the knife to move towards and from the meat to cut slits therein, and means to move the knife bodily in the direction of its cutting edge and relative to the knife-carrying member.

9. In a meat-slitting machine, the combination with means for feeding meat forward, of means to cut in the meat, as it is fed forward, a series of slits extending in the direction of feed, a knife-carrying member, a slitting knife carried thereby and having a cutting edge extending transversely of the line of feed, means to operate the knife-carrying member to cause the knife to move towards and from the meat to cut slits therein, and means to give the knife a movement in the direction of its cutting edge and relative to the knife-carrying member during the meat-slitting portion of the movement of the knife.

10. In a meat-slitting machine, the combination with means for feeding meat forward, of means to cut in the meat, as it is fed forward, a series of slits extending in the direction of feed, a knife-carrying member, a slitting knife carried thereby and extending transversely of the line of feed, means to operate the knife-carrying member to cause the knife to cut slits in the meat, and means rendered operative by the movement of the knife toward the meat to cause the knife to move in a direction transverse of the feed and relative to the knife-carrying member.

11. In a meat-slitting machine, the combination with means to feed meat forward, of means to cut in the meat, as it is fed forward, a series of slits extending in the direction of the line of feed, a rotary knife-carrying member situated above the meat-feeding means, a knife carried by said knife-carrying member and also situated above the knife-feeding means, said knife having a cutting edge extending transversely of the line of feed, and means to rotate said member to cause said knife to move bodily towards and from the meat to cut slits therein extending transversely to the line of feed.

12. In a meat-slitting machine, the combination with means to feed meat forward, of means to cut in the meat as it is fed forward a series of slits extending in the direction of the line of feed, a rotary knife-carrying member, a knife carried thereby and having a cutting edge extending transversely of the line of feed, means to rotate said member to cause said knife to move bodily towards and from the meat to cut slits therein extending transversely to the line of feed, and means carried by the rotary knife-carrying member to strip the meat from the knife.

13. In a meat-slitting machine, the combination with means to feed meat forward, of means to cut in the meat as it is fed forward, a series of slits extending in the direction of the line of feed, a rotary knife-carrying member, a knife carried thereby and having a cutting edge extending transversely of the line of feed, means to rotate said member to cause said knife to cut slits in the meat extending transversely to the line of feed, and means to give said knife a movement in the direction of its cutting edge and relative to the rotary knife carrier during its meat-slitting movement.

JOSEPH P. SPANG.